(12) United States Patent
Schmidt et al.

(10) Patent No.: US 10,047,794 B2
(45) Date of Patent: Aug. 14, 2018

(54) ROLLING BEARING FOR AN EXHAUST GAS TURBOCHARGER, AND CAGE FOR A ROLLING BEARING

(71) Applicant: Schaeffler Technologies AG & Co. KG, Herzogenaurach (DE)

(72) Inventors: Heiko Schmidt, Muehlhausen (DE); Christopher Mitchell, St. Austell Cornwall (GB)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/129,769

(22) PCT Filed: Mar. 6, 2015

(86) PCT No.: PCT/DE2015/200126
§ 371 (c)(1),
(2) Date: Sep. 27, 2016

(87) PCT Pub. No.: WO2015/149766
PCT Pub. Date: Oct. 8, 2015

(65) Prior Publication Data
US 2017/0146062 A1    May 25, 2017

(30) Foreign Application Priority Data
Apr. 1, 2014    (DE) .................. 10 2014 206 101

(51) Int. Cl.
*F16C 33/38* (2006.01)
*F16C 33/58* (2006.01)
(Continued)

(52) U.S. Cl.
CPC ........ *F16C 33/3806* (2013.01); *F01D 25/162* (2013.01); *F01D 25/18* (2013.01);
(Continued)

(58) Field of Classification Search
CPC .. F16C 19/184; F16C 33/3806; F16C 33/583; F16C 33/6659; F16C 33/6681; F16C 33/6685; F16C 2360/24
See application file for complete search history.

(56) References Cited

U.S. PATENT DOCUMENTS 7,909,513 B2    3/2011  Ueno
8,118,570 B2 *  2/2012  Meacham ............... F16C 33/10
                                                384/119
(Continued)

FOREIGN PATENT DOCUMENTS

CN    101120179      2/2008
DE    202004017194   11/2004
(Continued)

OTHER PUBLICATIONS

International Search Report dated Aug. 7, 2015 of PCT/DE2015/200126 (2 pages).

*Primary Examiner* — James Pilkington
(74) *Attorney, Agent, or Firm* — Davidson, Davidson & Kappel, LLC

(57) ABSTRACT

A rolling bearing (1) for an exhaust gas turbocharger, including an outer race (2) and an inner race (3), between which there roll rolling bodies (4) guided by a cage (7). The cage (7) is then guided with a cage guiding surface (9) on a raceway (10) of the outer race (2) and is equipped with openings (11) which connect the cage guiding surface (9) with that side of the cage (7) oriented toward the inner race (3), in order to guide lubricant thrown off through the inner race (3) between the cage guiding surface (9) and the raceway (10). In order to now improve a lubricant supply to the cage guide, the cage (7) is provided, on the side oriented toward the inner race (3), with at least one groove (12) into which each of the openings (11) opens.

9 Claims, 3 Drawing Sheets

(51) Int. Cl.
 *F16C 33/66* (2006.01)
 *F01D 25/16* (2006.01)
 *F01D 25/18* (2006.01)
 *F16C 19/18* (2006.01)
(52) U.S. Cl.
 CPC .......... *F16C 19/184* (2013.01); *F16C 33/583* (2013.01); *F16C 33/6659* (2013.01); *F16C 33/6681* (2013.01); *F05D 2220/40* (2013.01); *F16C 2360/24* (2013.01)

(56) References Cited

U.S. PATENT DOCUMENTS

| 8,622,622 | B2* | 1/2014 | Solfrank | F16C 33/3806 |
| | | | | 384/462 |
| 2008/0267548 | A1* | 10/2008 | Chriss | F16C 19/184 |
| | | | | 384/492 |
| 2010/0290728 | A1* | 11/2010 | Solfrank | F16C 33/3806 |
| | | | | 384/470 |
| 2015/0192176 | A1 | 7/2015 | Schmidt | |

FOREIGN PATENT DOCUMENTS

| DE | 102009021641 A1 | 11/2010 |
| DE | 102012211891 | 1/2014 |
| EP | 2287482 | 2/2011 |
| JP | 0510827 | 2/1993 |
| JP | 11336767 | 12/1999 |
| JP | 2000291664 | 10/2000 |
| JP | 200552501 | 4/2008 |

* cited by examiner

ROLLING BEARING FOR AN EXHAUST GAS TURBOCHARGER, AND CAGE FOR A ROLLING BEARING

The present invention relates to a rolling bearing for an exhaust gas turbocharger, including an outer race and an inner race, between which rolling elements roll, guided via a cage, the cage being guided on a contact surface of the inner race with the aid of a cage guiding surface and means being provided, via which lubricant spun off through the inner race is conductible between the cage guiding surface and the contact surface.

BACKGROUND

A rolling bearing for a turbocharger is apparent from DE 10 2009 021 641 A1, which includes an outer race and an inner race, between which rolling elements roll on raceways. The rolling elements are guided via a cage, which runs on a contact surface of the outer race via a cage guiding surface and is therefore guided on the side of the outer race. Means are furthermore provided, with the aid of which lubricant spun off through the inner race is conductible between the cage guiding surface and the contact surface for the purpose of lubricating the contact of the cage with the outer race and thus reducing wear. In the present case, these means are designed as openings in the cage, which each connect the cage guiding surface to a surface of the cage facing the inner race.

SUMMARY OF THE INVENTION

It is an object of the present invention is now to provide a rolling bearing, in which a lubricant supply of a cage guidance is further improved.

The present invention provides a rolling bearing for an exhaust gas turbocharger which includes an outer race and an inner race, between which rolling elements roll, guided via a cage. The cage is guided on a contact surface of the outer race with the aid of a cage guiding surface and is equipped with openings, which connect the cage guiding surface to a side of the cage facing the inner race for the purpose of conducting lubricant spun off through the inner race between the cage guiding surface and the contact surface.

The rolling bearing may be, in principle, a rolling bearing of any design, i.e., a ball bearing or a roller bearing. In addition to an application in an exhaust gas turbocharger, a use in a turbocompound or a turbocompressor is also conceivable. The cage of the rolling bearing is preferably equipped with an annular body, in which pockets are formed for accommodating the rolling elements. In the case of the rolling bearing of the present invention, this annular body of the cage is provided with openings, axially adjacent to the pockets, via which lubricant is exchangeable between a radially inner area of the body and a radially outer area to be able to conduct the lubricant within the rolling baring from the side facing the inner race to the cage guiding surface.

The openings in the cage may, in principle, have any shape, i.e. a cylindrical, rectangular, oval or similar design. With regard to their position, number and size, the openings are particularly preferably designed in such a way that no imbalance may be introduced into the cage thereby.

The present invention covers the technical teaching that the cage is provided with at least one groove on the side facing the inner race, each of which opens into the openings. In other words, the cage is therefore equipped with at least one groove which runs on the annular body of the cage, facing the inner race, and with each of which the openings merge.

Such a design of a rolling bearing has the advantage that the lubricant spun off through the inner race is collected in the base of the groove of the cage, from where it is able to enter between the cage guiding surface and the contact surface via the openings. The spun-off lubricant is thus held in the area of the openings, and the proportion of lubricant flowing via the openings is increased. During the course of the rotation, the lubricant spun off into the groove on the cage is then pressed through the openings to the cage guiding surface under the effect of centrifugal force. Due to the improved supply of the sliding contact between the cage and the outer race, an always adequate lubrication may thus be ensured in this area, thereby counteracting excessive wear.

In the case of DE 10 2009 021 641 A1, however, no groove is provided in the area of where the openings open and on the side of the inner race, so that only lubricant which has been spun off directly into the area of the openings may essentially enter the openings. Lubricant entering the space between the openings in the circumferential direction, however, would migrate either into the area of the rolling elements or in the opposite axial direction from the cage.

The at least one groove may have, in principle, any shape in terms of its cross section but preferably has a rectangular or trapezoidal design. Moreover, the at least one groove is preferably formed axially at the height of the cage guiding surface, so that the openings run purely radially from the at least one groove to the cage guiding surface. The extension of the openings may be kept short thereby.

According to one specific embodiment of the present invention, a circumferential groove is formed on the cage, into which the openings open. In this case, a single groove is therefore provided, which extends over the complete circumference of the cage and into which all openings thus open. Alternatively, however, multiple grooves may also be provided, which individually extend only over one portion of the circumference and connect the openings in this area to each other. Multiple circumferential grooves may furthermore be provided.

According to another embodiment of the present invention, an outer diameter of the inner race has a wedge-like profile at least at the height of the at least one groove. In one refinement of this design, the wedge-like profile defines a trough-like indentation on the outer diameter of the inner race, into which lubricant may be conveyed via a splash oil bore of the outer race. Due to the wedge-like profile, the lubricant sprayed onto the inner race via the splash oil bore is advantageously spun off in the direction of the cage upon the rotation of the inner race and enters the at least one groove. "Wedge-like" is understood to mean, in particular, a conical profile of the outer diameter, it also being able to be provided with a domed design, at least in sections. A trough-like indentation is then defined by two oppositely oriented wedges.

The present invention also provides a rolling bearing for an exhaust gas turbocharger which includes an outer race and an inner race, between which rolling elements roll, guided via a cage. In this case, the cage is guided on a contact surface of the outer race with the aid of a cage guiding surface, means being provided, via which lubricant spun off through the inner race is conductible between the cage guiding surface and the contact surface.

In the case of the rolling bearing of this design, the rolling bearing may also have, in principle, any design, i.e., it may be a ball or roller bearing. The cage of the rolling bearing is preferably provided with an annular body, in which pockets are formed for accommodating rolling elements. The cage guiding surface, via which the cage comes into contact radially with the contact surface of the outer race for guidance purposes, is then provided adjacent to these pockets.

The present invention also covers the technical teaching that the means include a radially inwardly projecting section of the outer race, situated at an axial distance from the cage, whose inner diameter is smaller than an outer diameter of the cage. The cage and the section of the outer race define, axially between them, a collecting area for the lubricant. In other words, the outer race thus has a radially inwardly projecting section, which radially overlaps the cage and is situated at an axial distance therefrom. The cage and this section thus define, axially between them, a collecting area for the lubricant, in which the spun-off lubricant may collect.

In this regard, a design of this type has the advantage that the spun-off lubricant collects in the collecting area, in particular vertically downwardly, on the stationary outer race and may subsequently migrate between the cage guiding surface and the contact surface. This ensures an adequate lubrication and counteracts wear.

In the case of DE 10 2009 021 641 A1, however, no collecting area is provided on the side of the outer race, so that the spun-off lubricant, which flows vertically downwardly under the effect of gravity, is unable to collect in the area between the cage guiding surface and the contact surface.

In another specific embodiment of the present invention, the outer race is provided with a recess in the collecting area. The collecting area may correspondingly be advantageously enlarged hereby, so that an adequate lubricant volume is able to collect in the vertically lower area of the outer race.

According to another embodiment of the present invention, at least one splash oil bore runs in the outer race, which opens into the collecting area and/or radially inwardly on the section of the outer race. A reliable supply of lubricant to the collecting area may be established hereby. If the opening takes place on the section of the outer race, the opening area may be provided with a cylindrical or conical design, in the latter case, a better supply of oil to the collecting area being established.

In one refinement of the present invention, the inner diameter of the section is larger than an inner diameter of the cage, an inner diameter of the outer race widening downstream from the section and on a side facing away from the cage. By designing a rolling bearing in this way, the lubricant collected in the collecting area flows off via the section in the direction of the widened area, starting at a certain quantity, instead of escaping via the cage in the direction of the rolling elements guided here. After all, due to the larger inner diameter of the section compared to an inner diameter of the cage, an overflow of lubricant takes place in the direction of the section, starting at a certain quantity, the widening of the outer race downstream from the section then promoting a further outflow of the excess lubricant. Conversely, if the inner diameter of the cage were to be larger than the inner diameter of the section, the lubricant would flow off in the direction of the guided rolling elements, starting at a certain quantity, and cause churning losses. In the installed state, the outer race is then provided vertically downwardly with an opening on the widened area, via which the outflowing lubricant may ultimately be removed from the outer race.

According to another specific embodiment of the present invention, an outer diameter of the inner race has a wedge-like profile at least at the height of the collecting area. The wedge-like profile again preferably defines a trough-like indentation on the outer diameter of the inner race, into which lubricant may be conveyed via a splash oil bore of the outer race. During the rotation of the inner race, due to the wedge-like profile, the desired spin-off of lubricant in the direction of the outer race is completed hereby, where the lubricant may collect in the collecting area.

The present invention is not limited to the specified combination of features of the other independent claims or the claims dependent thereon. Instead, it is possible to combine individual features with each other, even to the extent that they are apparent from the claims, the following description of preferred specific embodiments of the present invention or directly from the drawings. The reference to the drawings in the claims through the use of reference numerals is not intended to limit the scope of protection of the claims.

BRIEF DESCRIPTION OF THE DRAWINGS

Preferred specific embodiments of the present invention are explained in greater detail below on the basis of the appended drawings.

DETAILED DESCRIPTION

Figure 1:
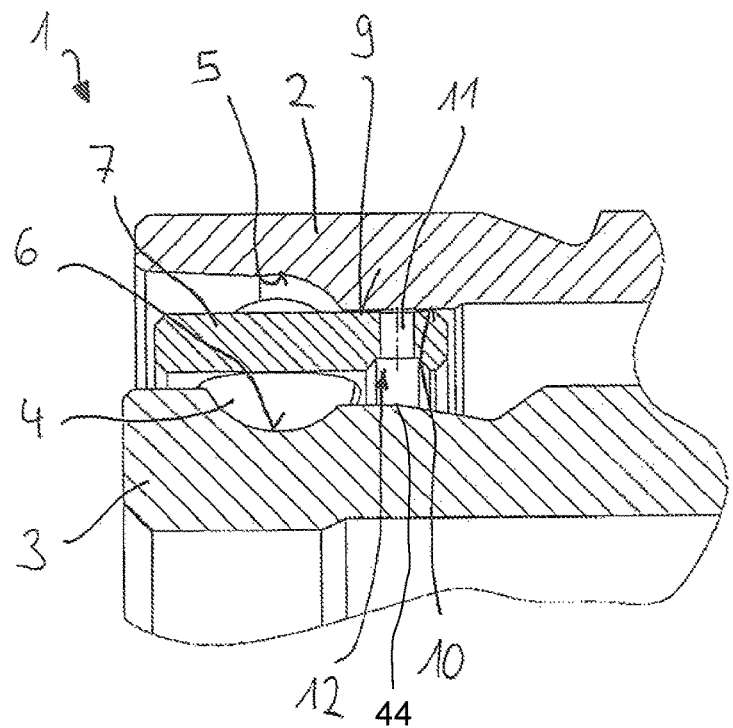
FIG. 1 shows a sectional representation of a rolling bearing according to a first specific embodiment of the present invention.

A sectional view of a rolling bearing 1 is apparent from FIG. 1, which is designed according to a first specific embodiment of the present invention and is preferably used for supporting a shaft of an exhaust gas turbocharger. Rolling bearing 1 includes an outer race 2, with respect to which an inner race 3 is radially inwardly provided, rolling elements 4 in the form of balls rolling between outer race 2 and inner race 3 on corresponding raceways 5 and 6 of outer race 2 and inner race 3. Rolling elements 4 are guided via a cage 7, in which rolling elements 4 run in correspondingly designed pockets 8, as is apparent, in particular, from the additional sectional view in FIG. 2. In the present case, rolling bearing 1 is designed in the manner of a slanting shoulder bearing, it being possible to provide the latter with a single-row or two-row design—in a corresponding continuation of the structure.

Cage 7 in the present case is guided on the side of outer race 2 during its rotation, cage 7 being equipped for this purpose with a cage guiding surface 9 axially adjacent to pockets 8, on which it is in contact with an opposite contact surface 10 of outer race 2. As a result, cage 7 slides along contact surface 10 of outer race 2 with the aid of its cage guiding surface 9.

To now adequately lubricate this contact area between cage 7 and outer race 2 and thus to reduce wear, cage 7 is also provided with multiple openings 11, which are each present in the form of cylindrical bores and run between cage guiding surface 9 and a circumferential groove 12. Groove 12 has a trapezoidal cross section and is formed on cage 7, axially facing inner race 3 at the height of cage guiding surface 9. As a result, openings 11 run purely radially between groove 12 and cage guiding surface 9.

Figure 2:
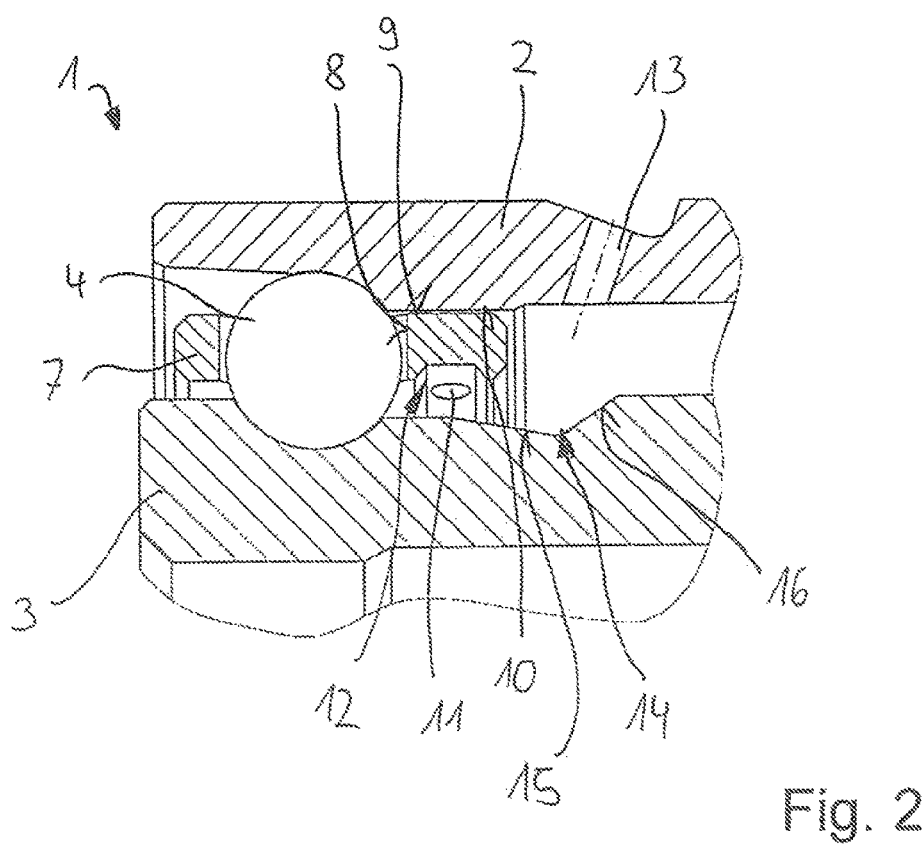
FIG. 2 shows another sectional view of the rolling bearing from FIG. 1.

The area between cage guiding surface 9 and contact surface 10 is now supplied via a splash oil bore 13, which is formed in outer race 2, as is apparent in FIG. 2, and sprays lubricant in the form of oil onto inner race 3. The lubricant is sprayed onto an indentation 14 of inner race 3, which is designed in the manner of a trough by two oppositely oriented, wedge-like profiles 15 and 16. Wedge profile 15 includes a radially outer edge 44 aligned with groove 12. According to this design of indentation 14, the lubricant runs along inner race 3 in the direction of rolling elements 4 when it strikes rotating inner race 3, profile 15 ending at the height of groove 12, so that the lubricant is spun off onto groove 12 of cage 7 in this area. From here, the lubricant may enter the desired area between cage 7 and outer race 2 via openings 11.

Figure 3:
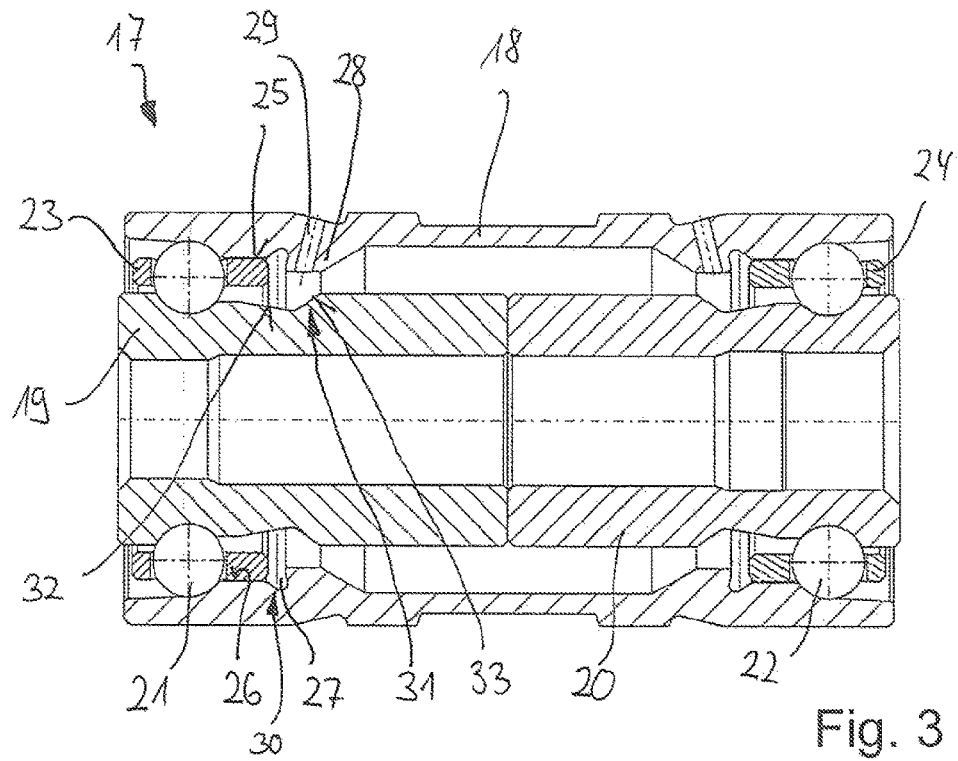
FIG. 3 shows a sectional representation of a rolling bearing according to a second embodiment of the present invention.

A sectional view of a rolling bearing 17 is apparent from FIG. 3 according to a second embodiment of the present invention, this rolling bearing 17 also being suitable, in particular, for supporting a shaft of an exhaust gas turbocharger. Rolling bearing 17 has a two-row design and includes an outer race 18 as well as two inner races 19 and 20 radially on the inside. Rolling elements 21 and 22 are provided between each of inner races 19 and 20 and outer race 18, which are each in the form of balls and roll on the side of outer race 18 as well as on the side of each corresponding inner race 19 and 20. Rolling elements 21 and 22 are each guided via a corresponding cage 23 and 24, which is guided on the side of outer race 18. The particular guiding area is supplied with lubricant, which is now described in greater detail on the basis of cage 23, a structure on the side of cage 24 being designed as a mirror-image configuration for this purpose.

As is apparent from FIG. 3, cage 23 runs on a contact surface 26 with the aid of a cage guiding surface 25, a supply of the gap with lubricant taking place via a collecting area 27 on the side of outer race 18. Collecting area 27 is defined between cage 23 and a section 28 of outer race 18, which projects radially inwardly and at the same time forms the opening of a splash oil bore 29 of outer race 18. Section 28 is designed to have a smaller inner diameter compared to an outer diameter of cage 23, so that section 28 delimits collecting area 27 opposite cage 23. A recess 30 is also introduced into outer race 18, axially between cage 23 and section 28, whereby collecting area 27 is correspondingly enlarged.

Lubricant is sprayed via splash oil bore 29 onto inner race 19 at an indentation 31, which is provided with a trough-like design by two wedge-like profiles 32 and 33. Due to wedge-like profiles 32, and 33, a lubrication of the running surfaces of rolling elements 21 takes place, as does a spin-off of lubricant onto outer race 18 during the rotation of inner race 19. This spun-off lubricant then runs vertically downwardly under the effect of gravity and collects in collecting area 27, where it migrates between cage 23 and outer race 18 after reaching a certain level and lubricates the contact between cage guiding surface 25 and contact surface 26.

As is furthermore apparent from FIG. 3, section 28 is designed to have a larger inner diameter than an inner diameter of cage 23, so that the lubricant collected vertically below in collecting area 27 escapes via section 28 after reaching a certain fill level. In addition, an inner diameter of outer race 18 widens downstream from section 28, so that the lubricant flowing over section 28 is able to enter the center area of outer race 18, where it may be removed via a recess—which is not illustrated in further detail in the present case.

Figure 4:
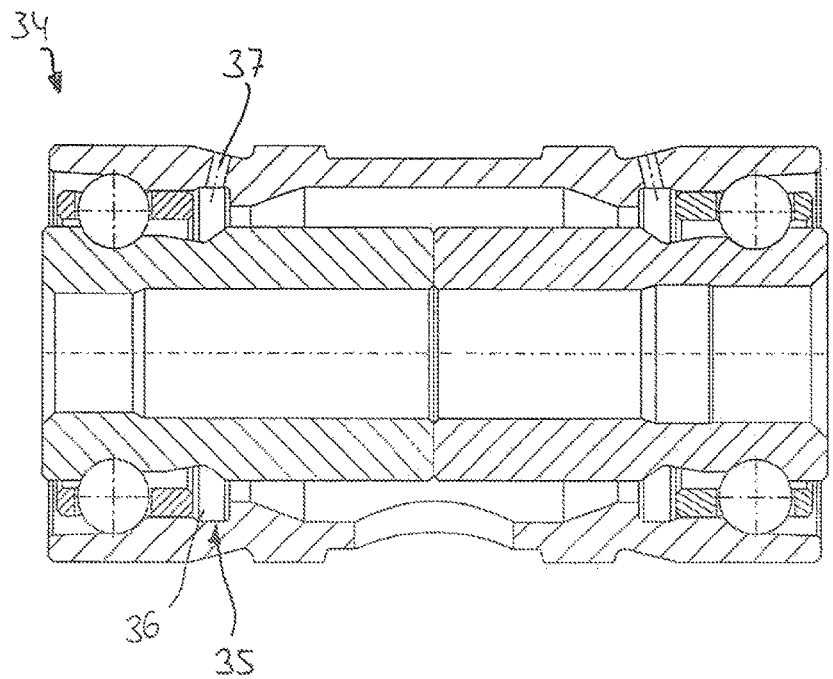
FIG. 4 shows a sectional view of a rolling bearing according to a third specific embodiment of the present invention.

A sectional view of a rolling bearing 34 is furthermore apparent from FIG. 4, according to a third specific embodiment of the present invention, this specific embodiment largely corresponding to the variant according to FIG. 3. The only difference is the formation of a recess 35 in the area of a collecting area 36 and the opening of a splash oil bore 37 in collecting area 36. In all other respects, the design corresponds to the variant according to FIG. 3, so that reference is hereby made to the above description.

Figure 5:
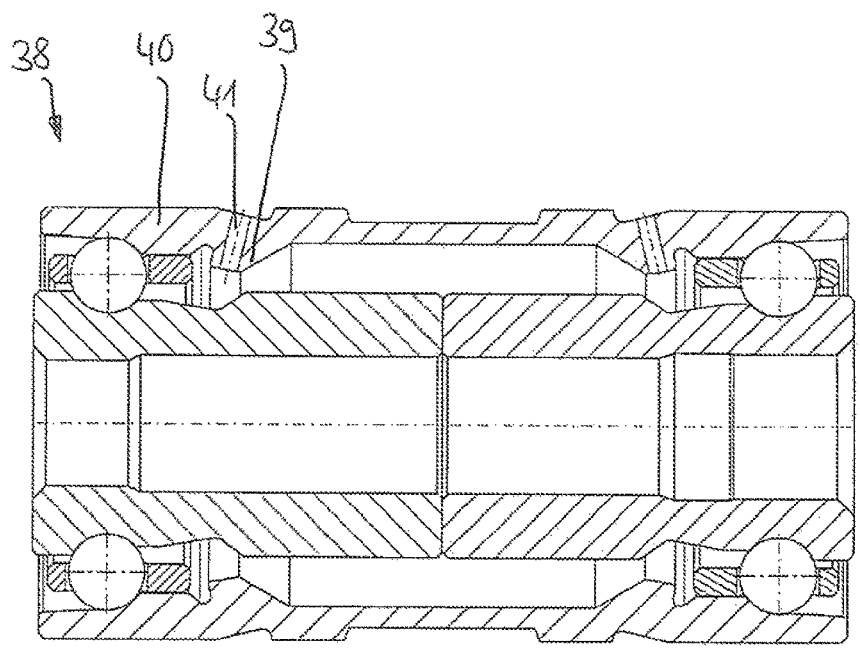
FIG. 5 shows a sectional representation of a rolling bearing according to a fourth embodiment of the present invention.

In addition, FIG. 5 shows a sectional view of a rolling bearing 38 according to a fourth embodiment of the present invention, this embodiment, in turn, largely corresponding to the variant according to FIG. 3. The only difference is that a radially inwardly protruding section 39 of an outer race 40 is not provided with a cylindrical design but rather has a conical profile. In other words, section 39 includes an inner diameter surface tapering towards the collecting area. In this regard, a better oil supply is provided via splash oil bore 41 running in section 39 due to this orientation. In all other respects, the specific embodiment according to FIG. 5 corresponds to the variant according to FIG. 3, so that reference is again made to the above description.

Figure 6:
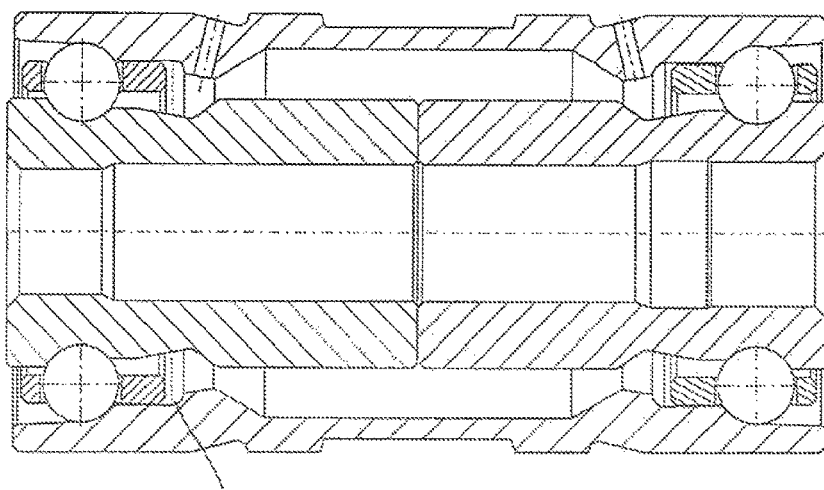
FIG. 6 shows a sectional view of a rolling bearing according to a fifth specific embodiment of the present invention.

Finally, a sectional representation of a rolling bearing 42 is also apparent from FIG. 6, according to a fifth embodiment of the present invention. This embodiment essentially corresponds to the design according to FIG. 5, the only difference being that a recess for defining a collecting area 43 is dispensed with. With respect to the rest of the design of rolling bearing 42, reference is made to the description of FIG. 5 or in continuation to the description of FIG. 3.

The lubrication of a cage guiding area may be improved with the aid of the designs of a rolling bearing according to the present invention.

LIST OF REFERENCE NUMERALS 1 rolling bearing
2 outer race
3 inner race
4 rolling element
5 raceway
6 raceway
7 cage
8 pocket
9 cage guiding surface
10 contact surface
11 opening
12 groove
13 splash oil bore
14 indentation
15 profile
16 profile
17 rolling bearing
18 outer race
19 inner race 20 inner race
21 rolling element
22 rolling element
23 cage
24 cage
25 cage guiding surface
26 contact surface
27 collecting area
28 section
29 splash oil bore
30 recess
31 indentation
32 profile
33 profile
34 rolling bearing
35 recess
36 collecting area
37 splash oil bore
38 rolling bearing
39 section
40 outer race
41 splash oil bore
42 rolling bearing
43 collecting area

The invention claimed is:

1. A rolling bearing for an exhaust gas turbocharger, the rolling bearing comprising:
an outer race and an inner race, rolling elements rolling between the outer race and the inner race and guided via a cage, the cage being guided on a contact surface of the outer race with the aid of a cage guiding surface and being equipped with openings connecting the cage guiding surface to a side of the cage facing the inner race for the purpose of conducting lubricant spun off by the inner race between the cage guiding surface and the contact surface, the cage having at least one groove on the side facing the inner race, each of the openings opening into the groove, an outer diameter of the inner race having a wedge profile including a radially outer edge aligned with the at least one groove.

2. The rolling bearing as recited in claim 1 wherein the groove is a circumferential groove.

3. The rolling bearing as recited in claim 1 wherein the wedge profile defines a trough indentation on the outer diameter of the inner race, the lubricant capable of being conveyed via a splash oil bore of the outer race into the trough indentation.

4. The rolling bearing as recited in claim 1 wherein the cage includes an annular body having pockets for accommodating the rolling elements, the body being provided with the openings axially adjacent to the pockets, lubricant being exchangeable via the openings between a radially inner area of the body and a radially outer area, the body having the at least one groove, the at least one groove having a trapezoidal shape on the side of the radially inner area.

5. A rolling bearing for an exhaust gas turbocharger, the rolling bearing comprising:
an outer race and an inner race, rolling elements rolling between the outer race and the inner race and guided via a cage, the cage being guided on a contact surface of the outer race with the aid of a cage guiding surface; and
means for conducting lubricant spun off by the inner race between the cage guiding surface and the contact surface, the means including a radially inwardly projecting section of the outer race situated at an axial distance from the cage and having an inner diameter smaller than an outer diameter of the cage, the cage and the inwardly projecting section of the outer race defining, axially between them, a collecting area for the lubricant, the radially inwardly projecting section of the outer race including an inner diameter surface tapering towards the collecting area.

6. The rolling bearing as recited in claim 5 wherein the outer race is provided with a recess in the collecting area.

7. The rolling bearing as recited in claim 5 wherein at least one splash oil bore runs in the outer race and opens into the collecting area or radially inwardly on the inwardly projecting section of the outer race.

8. The rolling bearing as recited in claim 7 wherein the inner diameter of the inwardly projecting section is larger than an inner diameter of the cage, an inner diameter of the outer race widens from the inwardly projecting section and on a side facing away from the cage.

9. The rolling bearing as recited in claim 5 wherein an outer diameter of the inner race has a wedge profile opposed to the collecting area.

* * * * *